United States Patent
Gurr

[11] 4,054,148
[45] Oct. 18, 1977

[54] COOLING DEVICE FOR LIQUID COOLING OF THERMOPLASTIC EXTRUSIONS AND A CALIBRATING DEVICE FOR THERMOPLASTICS EXTRUSIONS INCORPORATING SUCH A COOLING DEVICE

[76] Inventor: Rolf Gurr, Brunnenstrasse 105, D-4972 Lohne 2, Germany

[21] Appl. No.: 730,279

[22] Filed: Oct. 6, 1976

[30] Foreign Application Priority Data
Oct. 6, 1975 Germany ............................ 2544611

[51] Int. Cl.² .............................................. B08B 3/02
[52] U.S. Cl. .............................. 134/57 R; 134/64 R; 134/113; 425/135
[58] Field of Search ................. 134/56 R, 57 R, 64 R, 134/64 P, 113, 122 R, 122 P; 425/135; 266/113

[56] References Cited
U.S. PATENT DOCUMENTS

| | | | |
|---|---|---|---|
| 2,763,275 | 9/1956 | Cummings | 134/122 R X |
| 2,900,990 | 8/1959 | Cullen | 134/57 R |
| 3,580,158 | 5/1971 | Scholle | 134/57 R X |
| 3,893,465 | 7/1975 | Cheatwood | 134/122 |

FOREIGN PATENT DOCUMENTS

| | | | |
|---|---|---|---|
| 14,109 | 4/1956 | Germany | 134/122 |

Primary Examiner—Robert L. Bleutge
Attorney, Agent, or Firm—Emory L. Groff, Jr.

[57] ABSTRACT

A cooling device for liquid cooling of thermoplastics extrusions in an enclosed calibrating chamber comprises a plurality of liquid jets for spraying liquid into the calibrating chamber, a liquid receptacle for positioning beneath the calibrating chamber for receiving liquid sprayed into the calibrating chamber by the liquid jets, a pump for supplying liquid from the liquid receptacle to the liquid jets and monitoring devices for controlling the pump to maintain a liquid level selectively within the liquid receptacle or above the level of the liquid jets in the calibrating chamber. The invention also includes a calibrating device for calibrating thermoplastics extrusions and incorporating a cooling device as above mentioned.

5 Claims, 3 Drawing Figures

COOLING DEVICE FOR LIQUID COOLING OF THERMOPLASTIC EXTRUSIONS AND A CALIBRATING DEVICE FOR THERMOPLASTICS EXTRUSIONS INCORPORATING SUCH A COOLING DEVICE

BACKGROUND OF THE INVENTION

The invention relates to a device for calibrating pipes or profiles extruded from thermoplastics, in which the extrudate is cooled in an enclosed calibrating chamber, which may be under vacuum, by means of a liquid which is sprayed on to it by means of nozzles and is extracted by a pump from a receptacle arranged below the calibrating chamber in which the liquid collects again after spraying.

Vacuum calibrating devices of different constructions are known, these being used successfully and economically when air support calibrating devices cannot be used because of very small pipe or profile dimensions, very small wall thicknesses, very high extrusion speeds or because of the nature of certain plastics. Thus heat must be removed from the pipes or profiles calibrated down to the desired cross-section by means of different constructions of sleeves and discs, to such an extent that after leaving the calibrating device they no longer change their shape. Both conventional methods for this purpose, i.e. passing the extrudate either through a spray comprising jet sprayed water or through a container full of cooling liquid, have various advantages and disadvantages in terms of method, which have an effect on starting and output of the plant as well as on the accuracy as to size of the finished product.

SUMMARY OF THE INVENTION

It is an object of the invention to create a device which is to be used for all the above-mentioned types of calibration while providing for the best possible cooling of the extrudate. It should fulfill the preconditions of being able to match the cooling process to the changing operating conditions while utilizing the respective special features of the spraying or dipping method.

According to the invention, there is provided a cooling device for liquid cooling of thermoplastics extrusions in an enclosed calibrating chamber comprising a plurality of liquid jets for the calibrating chamber, a liquid receptacle for positioning beneath the calibrating chamber for receiving liquid sprayed into the calibrating chamber by said liquid jets, a pump for removing liquid from said liquid receptacle and supplying said liquid to said liquid jets under pressure and monitoring devices for controlling said pump to maintain a liquid level selectively within said liquid receptacle or above the level of said liquid jets in said calibrating chamber.

Further according to the invention, there is provided a calibrating device for calibrating thermoplastics extrusions comprising an enclosed calibrating chamber, through which the extrusions pass, a plurality of liquid jets in said calibrating chamber for spraying cooling liquid onto the extrusions passing therethrough, a liquid receptacle situated beneath said calibrating chamber for receiving liquid from said calibrating chamber, a pump for removing liquid from said liquid receptacle and supplying said liquid to said liquid jets, monitoring devices for controlling said pump to maintain a liquid level selectively within said liquid receptacle or above the level of said liquid jets in said calibrating chamber and a controllable liquid outlet between said pump and said liquid receptacle for removing liquid from the system of said liquid jets, said calibrating chamber, said liquid receptacle and said pump when lowering said liquid level from said level above said liquid jets to said liquid level in said receptacle.

BRIEF DESCRIPTION OF THE DRAWINGS

The invention will now be described in greater detail, by way of example, with reference to the drawings in which.

DESCRIPTION OF THE PREFERRED EMBODIMENT

Figure 1:
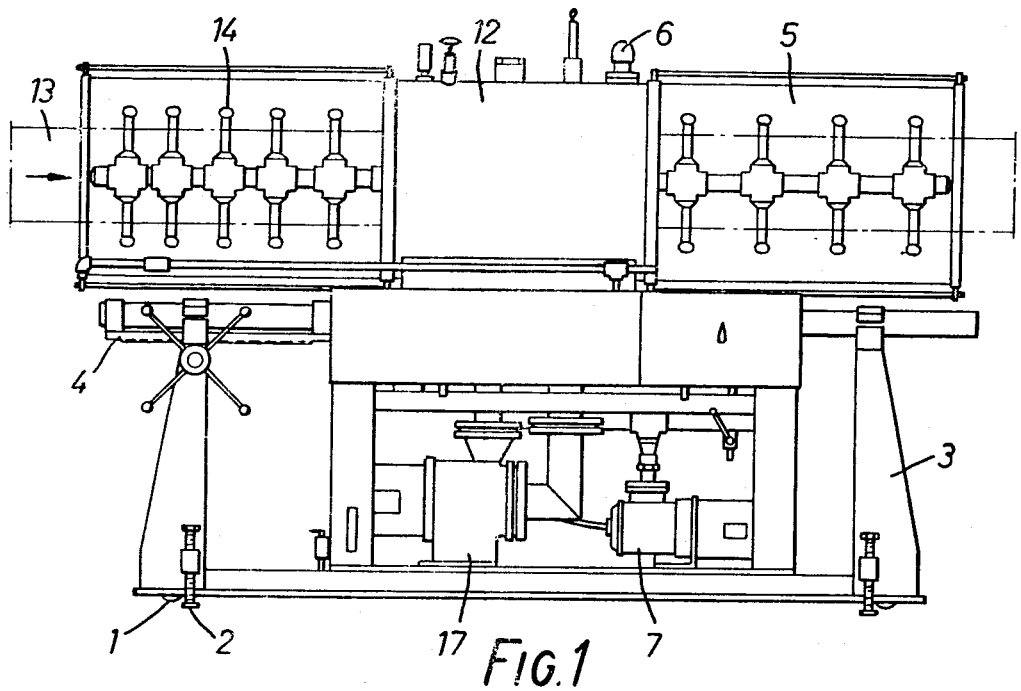
FIG. 1 shows the side view of a calibrating and cooling device constructed in accordance with the invention.
Figure 2:
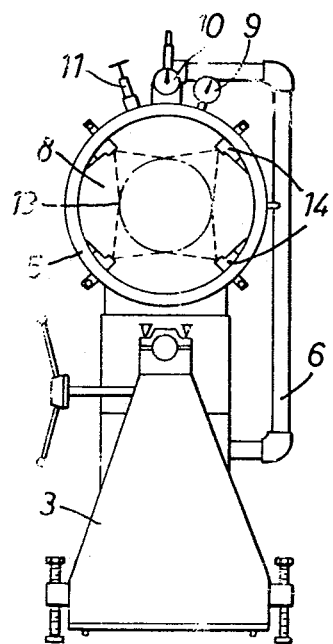
FIG. 2 shows a front view of the device of FIG. 1.

In a preferred embodiment of the invention, in a calibrating device for thermoplastics extrusions as mentioned at the outset, the liquid in the collecting receptacle below the calibrating chamber may be raised if desired, controlled by monitoring devices, up to a position of the liquid provided above the jets in the calibrating chamber and may be lowered from this position again into the collecting receptacle, wherein the quantity of liquid to be removed in order to lower the liquid level may escape in a controlled manner between the pump and liquid jets through a valve which is in active connection with the monitoring devices. In an advisable refinement, the monitoring devices regulating the position of the liquid level should comprise float switches.

Moreover, the invention achieves the preconditions that a circulating cooling liquid may also be used to cool the calibrating element, while otherwise new liquid must be constantly supplied thereto. This results in a high economic benefit as the total requirement for cooling liquid, which is particularly high at high extrusion speeds, is considerably reduced.

In order to observe the calibrating process constantly and thereafter to be able to determine whether cooling of the extrudate should take place according to the spraying or dipping method, it is moreover recommended that the calibrating chamber should have, on opposite sides, a tube-shaped casing manufactured from a highly transparent material.

The device in accordance with the invention makes it possible to calibrate economically pipes or profiles extruded from all plastics under consideration, while permitting the required tolerances for the finished product with regard to its cross-section and its other properties to be maintained at a high extrusion speed. As a result of the capability of the cooling process to be matched to the respective conditions prevailing, the difficulties normally arising during calibration may be circumvented and thus the output of the plant may be increased. Even restrictions in the wall thickness of the extrudate do not arise because, for example, when calibrating pipes of large diameter, it is readily possible to operate with air support in addition to the vacuum prevailing in the calibrating chamber or if necessary to dispense completely with the vacuum.

The possibility of observing the calibration process which is offered by the tube-shaped casing manufactured from highly transparent material is of considerable importance for starting and arranging the calibration. In addition it serves for prompt recognition of errors in the extrudate and the collection of results to enable the most favourable construction of the calibrating insert and for selection of the respective correct form of cooling.

Referring now to the drawings, there is shown a k device with a lower part 3 which may be moved on rollers 1 and may be retained in a stationary position by lowerable feet 2. A tube-shaped casing 5 which may be displaced longitudinally by means of a fine adjustment device 4 is mounted on the lower part 3. The casing forms a calibrating chamber 8 which is connected to a vacuum pump 7 via a suction line 6. It is constructed from sections of highly transparent material on both sides of a metal ring 12 equipped with a temperature indicator 9, a vacuum meter 10 and a pressure control valve 11. The metal ring thus acts as a supply section. Any desired calibrating insert (not shown) is provided in the tube-shaped casing 5, the extrudate 13, in the present case a pipe, passing from the calibrating insert in the direction of the arrow.

Figure 3:
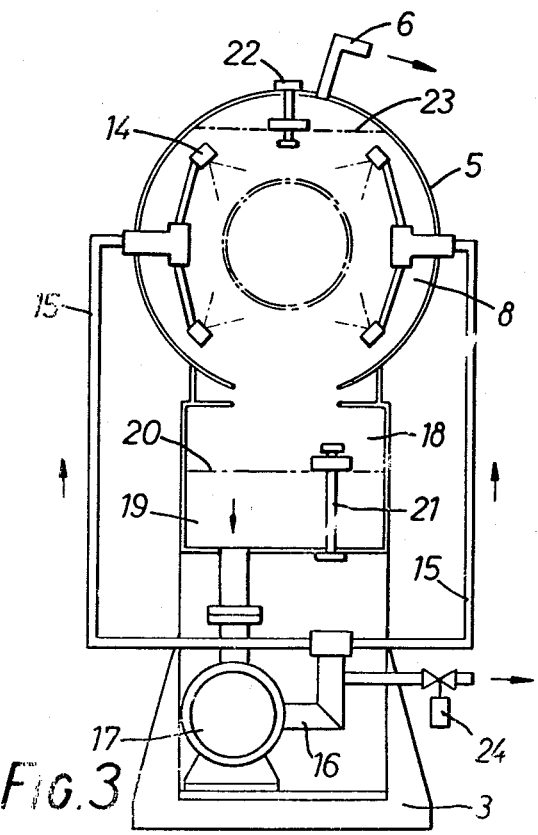
FIG. 3 shows a schematic sectional view giving the mode of operation of the device shown in FIGS. 1 and 2. de

On the circumference of the calibrating chamber 8 are arranged spray jets 14 spaced over the length of the tube-shaped casing 5, the spray jets being in connection with the pressure connection 16 of a pump 17 assembled near a vacuum pump 7 in the lower part 3 via lines 15 visible from FIG. 3. This pump 17 removes cooling liquid 19 from a collecting receptacle or container 18 which is arranged below the calibrating chamber 8 and produces a cooling mist surrounding the extrudate 13 passed therethrough with the aid of the spray jets 14 in the calibrating chamber 8.

The liquid level 20, which is adjusted in the collecting receptacle 18 because of the supply of fresh water which comes from the calibrating insert, is monitored by a float switch 21. It may if desired be raised from the liquid position 20 up to a liquid position 23 provided above the spray jets 14 in the calibrating chamber 8, regulated by a further float switch 22, if operation is according to the dipping cooling method. Similarly this position may be lowered again into the collecting receptacle 18 wherein the surplus quantity of liquid thus occurring, or occurring in the case of increased supply of fresh water, escapes in controlled manner behind the pressure connection 16 of the pump 17 through a magnetic valve 24 actively connected with the float switches 21 and 22. In this manner it is possible at any time to change from spray cooling to dip cooling without causing any kind of operating expense and production failure, if said cooling appears to be advantageous because of the extrudate or type of plastics.

If, in certain conditions, air support calibration is to be preferred, then the whole calibrating device as seen in the drawings may be moved towards the tool of the extruder up to a spacing of approximately 1 mm, and it may then be worked with drawing rams, drawing mandrels or ducking mandrels. Similarly combination calibration is possible in borderline cases. The device in accordance with the invention always gives a high economic benefit because, by using it, for example, the calibration inserts for the air support calibration are cheaper for a factor compared to the conventional methods and deposits of water may be overcome without difficulty. The advantages for large pipe manufacture are remarkable inasmuch as the device may be moved on rollers 1 and thus it is not fixed to the tool of the extruder.

It will be understood that the above description of the present invention is susceptible to various modification changes and adaptations.

What is claimed is:

1. A cooling device for liquid cooling of thermoplastics extrusions in an enclosed calibrating chamber comprising a plurality of liquid jets for the calibrating chamber, a liquid receptacle for positioning beneath the calibrating chamber for receiving liquid sprayed into the calibrating chamber by said liquid jets, a pump for removing liquid from said liquid receptacle and supplying said liquid to said liquid jets under pressure and monitoring device for controlling said pump to maintain a liquid level selectively within said liquid receptacle or above the level of said liquid jets in said calibrating chamber.

2. A cooling device as defined in claim 1 and comprising a controllable liquid outlet between said pump and said liquid jets for removing liquid from the system of said liquid jets, said pump and said liquid receptacle when lowering said liquid level from said level above said liquid jets to said liquid level in said liquid receptacle.

3. A calibrating device for calibrating thermoplastics extrusions comprising an enclosed calibrating chamber, through which the extrusions pass, a plurality of liquid jets in said calibrating chamber for spraying cooling liquid onto the extrusions passing therethrough, a liquid receptacle situated beneath said calibrating chamber for receiving liquid from said calibrating chamber, a pump for removing liquid from said liquid receptacle and supplying said liquid to said liquid jets, monitoring devices for controlling said pump to maintain a liquid level selectively within said liquid receptacle or above the level of said liquid jets in said calibrating chamber and a controllable liquid outlet between said pump and said liquid receptacle for removing liquid from the system of said liquid jets, said calibrating chamber, said liquid receptacle and said pump when lowering said liquid level from said level above said liquid jets to said liquid level in said receptacle.

4. A calibrating device as defined in claim 3, wherein said monitoring devices comprise float switches for monitoring the level of said liquid.

5. A calibrating device as defined in claim 3, and comprising two tube section casings manufactured from highly transparent material, located at opposite ends of said calibrating chamber and arranged to pass the thermoplastics extrusions to and from said calibrating chamber.

* * * * *